UNITED STATES PATENT OFFICE.

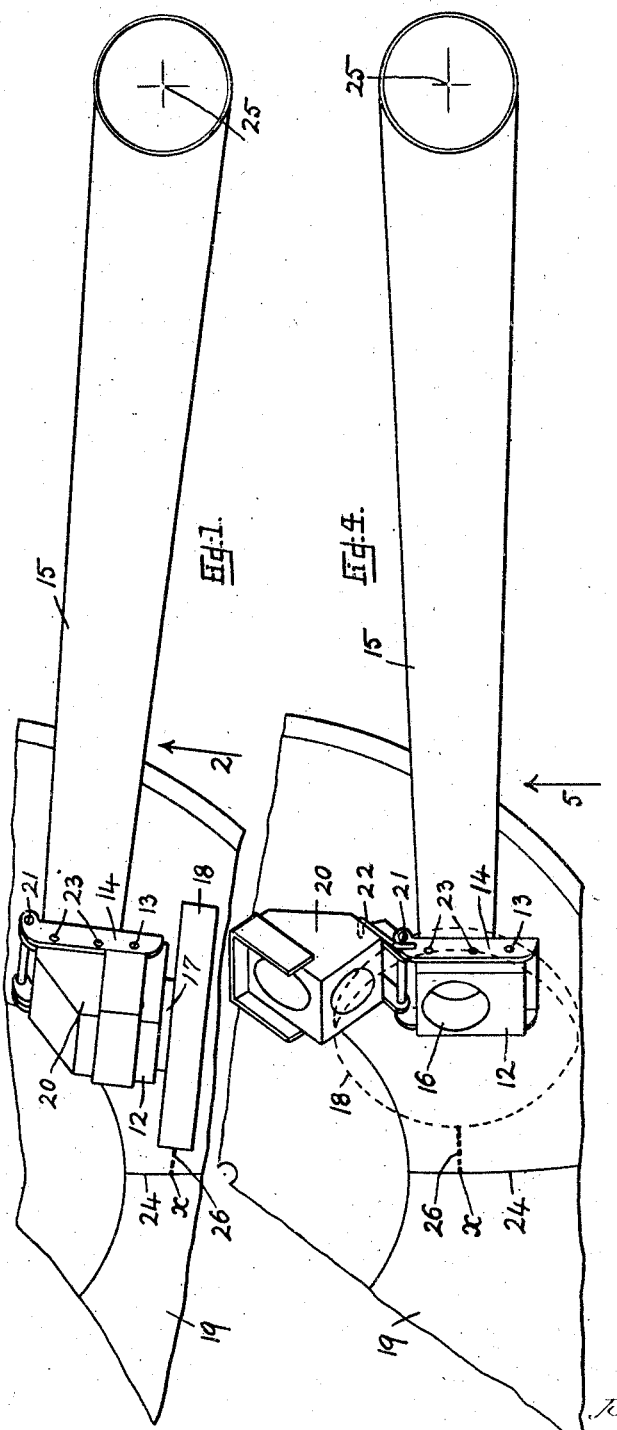

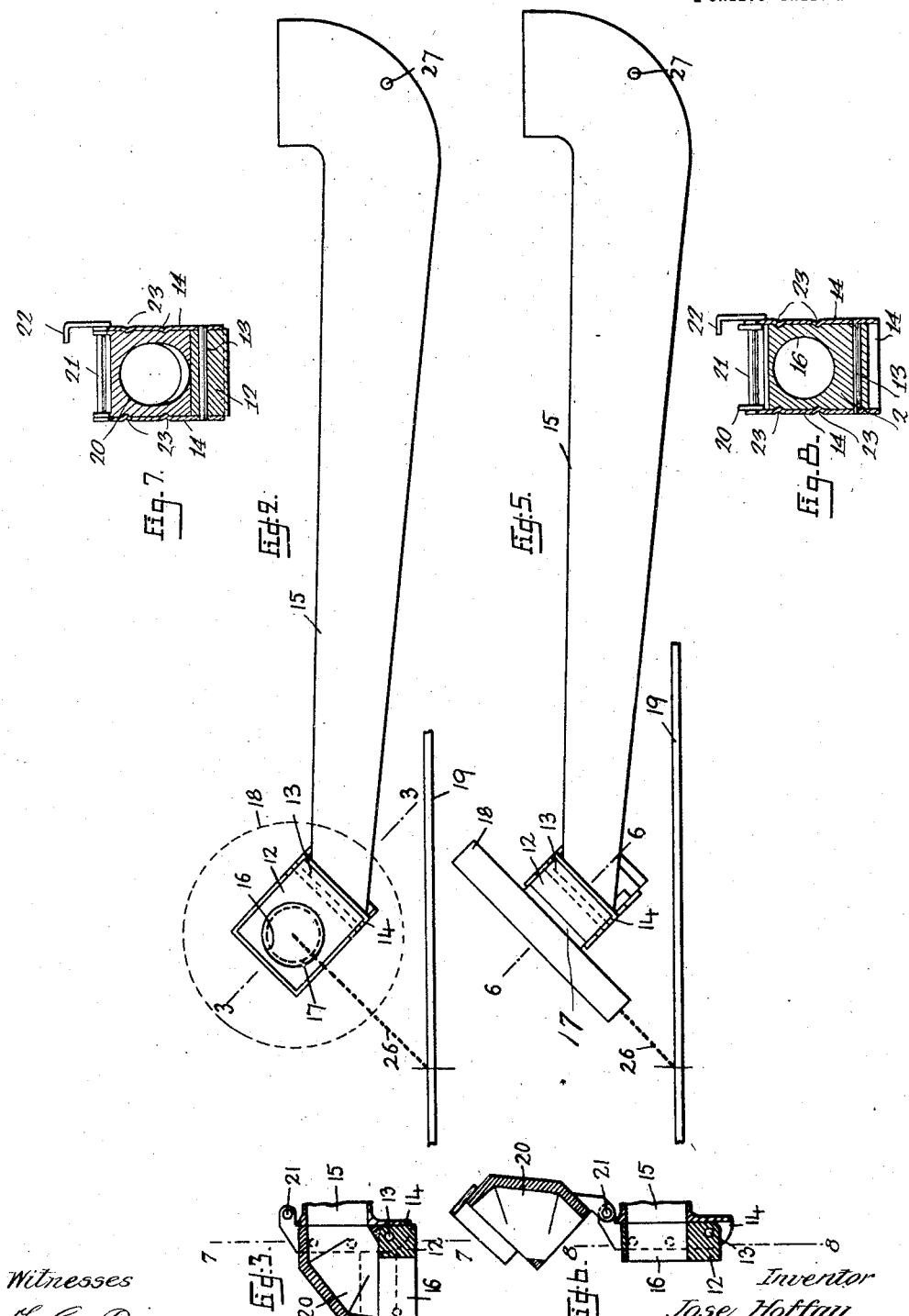

JOSE HOFFAY, OF LONDON, ENGLAND.

GRAMOPHONE AND THE LIKE MACHINE.

1,202,521.  Specification of Letters Patent.  Patented Oct. 24, 1916.

Application filed May 1, 1914. Serial No. 835,649.

*To all whom it may concern:*

Be it known that I, JOSE HOFFAY, a citizen of the Republic of Mexico, and a resident of London, England, have invented certain new and useful Improvements in Gramophones and the like Machines; and I do hereby declare the following to be a full, clear, and exact description of the same.

This invention relates to improvements in or relating to the mounting of sound boxes in gramophones, phonographs and the like machines.

The invention consists in a coupling comprising a hollow block or member, permanently or detachably connected to the sound box or the tone arm or sound tube and pivoted on the tone arm or sound tube or on a support thereon, preferably at a point outside the sound passage adapted to present an opening facing forwardly, approximately in the direction of the sound groove, or facing laterally transversely to the sound groove, for connecting the sound box to the tone arm or the like, the hollow block or member being adapted, in one position, to complete a tight communication between the sound box and the tone arm or the like, and, in another position, to break the communication, and displaceable means being provided for restoring the communication when so broken and at such time aiding in securing the hollow block or member in position.

The invention is represented, by way of example, in the accompanying drawings, in which:—

Figure 1 is a plan view of my improved device; Fig. 2 is a side elevation thereof, looking in the direction of the arrow 2 shown in Fig. 1; Fig. 3 is a detail sectional view taken on the line 3—3 shown in Fig. 2; Fig. 4 is a plan view of the device shown in Fig. 1; Fig. 5 is a side elevation looking in the direction of the arrow 5 shown in Fig. 4; Fig. 6 is a detail sectional view taken on the line 6—6 shown in Fig. 5; Fig. 7 is a detail sectional view taken on the line 7—7 shown in Fig. 3; and Fig. 8 is a detail sectional view taken on the line 8—8 shown in Fig. 6.

In carrying out the invention the coupling may, as shown in Figs. 1 to 6, comprise a block or member, 12, pivotally mounted, at 13, in a casing, 14, on the end of the tone arm, 15. The block is formed with a bore, 16, extending therethrough for receiving the hollow boss, 17, of the sound box, 18. The pivot is disposed at one side of the center of the passage through the tone arm so that by turning the block outward to the position shown in Fig. 3, the bore, 16, is directed laterally for holding the sound-box, 18, approximately in the direction of the sound groove in the record, 19, *vide* Fig. 1; and so that by turning the block inward to the position shown in Fig. 6, the bore, 16, is directed forwardly for holding the sound-box transversely to the sound groove, *vide* Fig. 4.

A complementary hollow elbow-piece, cover, or equivalent means, 20, is pivotally mounted, at 21, in the casing, 14, at the other side of the tone arm, so that when the block, 12, is in the outward position shown in Fig. 3, bearing against the casing, 14, which serves as a stop, the elbow-piece, 20, may be turned inward as shown to complete the communication between the sound-box and the tone arm and aid in securing the block, 12, rigidly in position, by serving as a rigid obstruction between the casing, 14, and the block, 12. When the block, 12, is in the inward position shown in Fig. 6, the elbow-piece is turned outward clear of the other parts. The elbow-piece may be turned outward against one angularly bent end, serving as a stop, of a piece of spring wire, 22, the other end of which is secured to the casing, 14.

The block, 12, and the elbow-piece, 20, may be secured in their respective inward positions by detents, 23, on the casing, 14. The detents, 23, consist of inward projections on the sides of the casing, 14, and they operate by engaging in indents, in the sides of the elbow-piece, 20, and in the sides of the block, 12, as shown in Figs. 7 and 8. The detents, 23, being formed on the thin sides of the casing, 14, may be sprung outward to permit the elbow-piece, 20, and the block, 12, to be moved by hand when desired.

The same distance between the stylus point and the vertical axis or support of the tone arm, for the two positions of the sound box, may be obtained by disposing the pivot, 13, more or less to the side of the center of the passage through the tone arm, and by making the width of the block in the direction of its bore less than the length of the block transversely thereto.

24 represents a given distance on the sound record, from the vertical axis, 25, of the tone arm, and the heavy dotted line, 26, represents the stylus lever and stylus. It will be seen in Figs. 1 and 4 that the stylus working position, x, is the same both for zig-zag and for hill-and-dale records.

The sound box boss may be secured in the block, 12, by a set screw or in any other convenient manner, and it is only necessary to turn the block in the casing, as shown in Fig. 6, and then move the elbow piece out of the way, or at right angles to the casing, as shown in Fig. 3; thereafter moving the elbow piece to restore communication, thereby adjusting the sound box for playing records of different cuts according to requirements.

27 is the pivot of vertical oscillation of the tone arm.

In the claims, the term "tone arm" is intended, besides any special signification it may have, to comprehend any form of articulated or non-articulated sound tube, horn, or other sound conveying means.

What I claim as my invention and desire to secure by Letters Patent is:—

1. In a gramophone, in combination, a sound box, a tone arm, a support on the tone arm, a hollow member pivoted on said support and adapted in one position to complete a tight communication between the sound box and the tone arm and in another position to break such communication, a single displaceable member for restoring such communication when so broken and at such time aiding in securing said hollow member in position by serving as a rigid obstruction between said support and said hollow member, and means for keeping said movable members in the positions desired.

2. In a gramophone, in combination, a sound box, a tone arm, a support on the tone arm, a hollow member pivoted on said support and adapted to present an opening facing forwardly approximately in the direction of the sound groove of the record, or facing laterally transversely to the sound groove of the record, the hollow member being adapted to complete a tight communication between the sound box and the tone arm in one position, and to break such communication in another position, a single displaceable member for restoring such communication when so broken and at such time aiding in securing said hollow member in position by serving as a rigid obstruction between said support and said hollow member, and means for keeping said movable members in the positions desired.

3. In a gramophone, in combination, a sound box, a tone arm, a support on the tone arm, a hollow member pivoted on said support at a point outside the sound passage and the ordinary thickness of the walls thereof, and adapted in one position to complete a tight communication between the sound box and the tone arm and in another position to break such communication, a single displaceable member for restoring such communication when so broken and at such time aiding in securing said hollow member in position by serving as a rigid obstruction between said support and said hollow member, and means for keeping said movable members in the positions desired.

4. In a gramophone, in combination, a sound box, a tone arm, a support on the tone arm, a hollow member pivoted on said support and adapted in one position to complete a tight communication between the sound box and the tone arm and in another position to break such communication, a single pivotally mounted member for restoring such communication when so broken and at such time aiding in securing said hollow member in position by serving as a rigid obstruction between said support and said hollow member, and means for keeping said pivotally mounted members in the positions desired.

5. In a gramophone, in combination, a sound box, a tone arm, a support on the tone arm, a hollow member pivoted on said support and adapted in one position to complete a tight communication between the sound box and the tone arm and in another position to break such communication, pivotally mounted means for restoring such communication when so broken and which at such time aid in securing said hollow member in position but which may be turned outward clear away from between said hollow member and the tone arm when not required for use, and means for keeping said pivotally mounted members in the positions desired.

6. In a gramophone, in combination, a sound box, a tone arm, a support on the tone arm, a member having a passage, turnably mounted on said support and adapted in one position, suitable for hill-and-dale records, to complete a tight communication between the sound box and the tone arm, and in another position, suitable for horizontally zig-zag records, to break such communication, a single displaceable member for restoring such communication when so broken and at such time aiding in securing said hollow member in position by serving as a rigid obstruction between said support and said hollow member, and means for keeping said movable members in the positions desired.

7. In a gramophone, in combination, a sound box, a tone arm, a support on the tone arm, a hollow member so pivoted on said support and so constructed as to obtain the same distance between the stylus point and the vertical axis of the horn end of the tone arm, for two positions of the sound box respectively for horizontally zig-zag and hill-and-dale records, the hollow member being adapted to complete a tight communication between the sound box and the tone arm in one position, and to break such communication in another position, a single displaceable member for restoring such communication when so broken and at such time aiding in securing said hollow member in position by serving as a rigid obstruction between said support and said hollow member, and means for keeping said movable members in the positions desired.

8. Coupling means for connecting a sound box to the tone arm of a gramophone, comprising a hollow member adapted to be connected to one of said parts and to be turnably mounted on the other of said parts and to complete a tight communication therebetween in one position and to break such communication in another position, a single displaceable member for restoring the communication when so broken and at such time aiding in securing said hollow member in position by serving as a rigid obstruction between said hollow member and the part on which the latter is mounted, and means for keeping said movable members in the positions desired.

9. Coupling means for connecting a sound box to the tone arm of a gramophone, comprising a hollow member adapted to be connected to one of said parts and to be turnably mounted on the other of said parts and to complete a tight communication therebetween in one position and to break such communication in another position and further to obtain the same distance between the stylus point and the vertical axis of the horn end of the tone arm, for the two positions of the sound box for hill-and-dale and horizontally zig-zag records, a single displaceable member for restoring the communication when so broken and at such time aiding in securing said hollow member in position by serving as a rigid obstruction between said hollow member and the part on which the latter is mounted, and means for keeping said movable members in the positions desired.

10. Coupling means for connecting a sound box to the tone arm of a gramophone, phonograph, or the like machine, comprising a casing adapted to be attached to one of said parts, a hollow member adapted to be attached to the other of said parts and turnably mounted in the casing on one side of the passage through the member to which the casing is attached, and adapted to complete the communication between the sound box and the tone arm in one position and to break such communication in another position, means pivoted on the other side of said passage for completing the communication when so broken, and means for holding said movable members in the positions desired.

11. Coupling means for connecting a sound box to the tone arm of a gramophone, comprising a casing adapted to be attached to one of said parts, a hollow member adapted to be attached to the other of said parts and turnably mounted in the casing on one side of the passage through the member to which the casing is attached, and adapted to complete the communication between the sound box and the tone arm in one position and to break such communication in another position and further to obtain the same distance between the stylus point and the vertical axis of the horn end of the tone arm, for the two positions of the sound box for hill-and-dale and horizontally zig-zag records, means pivoted on the other side of said passage for completing the communication when so broken, and means for holding said movable members in the positions desired.

12. Coupling means for connecting a sound box to the tone arm of a gramophone, comprising a casing serving as a stop and adapted to be attached to one of said parts, a hollow member adapted to be attached to the other of said parts and turnably mounted in the casing and adapted to complete a tight communication between the sound box and the tone arm in one position and to break such communication in another position, a single displaceable member for restoring the communication when so broken and at such time aiding in securing said hollow member in position by serving as a rigid obstruction between said casing and said hollow member, and means for keeping said movable members in the positions desired.

13. Coupling means for connecting a sound box to the tone arm of a gramophone, comprising a casing serving as a stop and adapted to be attached to one of said parts, a hollow member adapted to be attached to the other of said parts and turnably mounted in the casing and adapted to complete a tight communication between the sound box and the tone arm in one position and to break such communication in another position and further to obtain the same distance between the stylus point and the vertical axis of the horn end of the tone arm, for the two positions of the sound box for hill-and-dale and horizontally zig-zag records, a single displaceable member for restoring the communication when so broken and at such time aiding in securing said hollow member in position by serving as a rigid obstruction between said casing and said hollow member, and means for keeping said movable members in the positions desired.

14. Coupling means for connecting a sound box to the tone arm of a gramophone, comprising a hollow member adapted to be pivotally mounted on one of said parts and to be attached to the other of said parts and adapted to complete a tight communication therebetween in one position and to break such communication in another position, a single displaceable member for restoring the communication when so broken and at such time aiding in securing said pivotally mounted member in position by serving as a rigid obstruction between said hollow member and the part on which the latter is mounted, and means for keeping said pivotally mounted member in the positions desired.

15. Coupling means for connecting a sound box to the tone arm of a gramophone, comprising a hollow member adapted to be pivotally mounted on one of said parts and to be attached to the other of said parts and adapted to complete a tight communication therebetween in one position and to break such communication in another position and further to obtain the same distance between the stylus point and the vertical axis of the horn end of the tone arm, for the two positions of the sound box for hill-and-dale and horizontally zig-zag records, a single displaceable member for restoring the communication when so broken and at such time aiding in securing said pivotally mounted member in position by serving as a rigid obstruction between said hollow member and the part on which the latter is mounted, and means for keeping said pivotally mounted member in the positions desired.

16. In a gramophone, the combination with the tone arm, of a casing attached thereto, a sound box, a member attached to said sound box and pivoted to the casing whereby in one position a direct communication is formed between the sound box and tone arm, and in another position said communication is broken, unitary means for completing such communication when broken, and means for keeping said movable members in the positions desired.

17. In a gramophone, in combination with the tone arm, of a casing attached thereto, a sound box, a member attached to the sound box and pivoted to the casing at one side of the center of the passage of the tone arm, whereby in one position said member completes the communication between the sound box and the tone arm, and breaks such communication in another position, unitary means for completing such communication when broken, and means for keeping said movable members in the positions desired.

18. In a gramophone, the combination with the tone arm, of a casing attached thereto, a sound box, a member attached to said sound box and pivoted to the casing whereby in one position said member completes the communication between the sound box and tone arm, and in another position said communication is broken, a pivotally mounted unitary member for completing such communication when so broken, and means for keeping said pivotally mounted members in the positions desired.

19. In a gramophone, the combination with the tone arm having a casing secured thereto, of a sound box, a hollow member attached to said sound box and pivoted to the casing whereby in one position said member completes the communication between the sound box and tone arm and in another position said communication is broken, pivotally mounted means for completing such communication when so broken, and which may be moved clear from the sound-box when not required for use, and means for keeping said pivotally mounted members in the positions desired.

20. In a gramophone, the combination with the tone arm, of a casing attached thereto, a sound box, a member having a through passage, attached to said sound box and pivoted to the casing, adapted in one position, to complete communication between the sound box and tone arm, and in another position to break such communication, unitary means for completing such communication when so broken, and means for holding said movable members in the positions desired.

21. In a gramophone, the combination with the tone arm, of a casing attached thereto, a sound box, a member attached to said sound box and pivoted to the casing so that the radius between said pivot and the longitudinal axis of the stylus of the sound box is substantially the same as the distance between said pivot and the center of the sound passage of the tone arm to automatically obtain the same distance between the stylus point and the vertical axis or support of the tone arm, in the alternate positions of the sound box for horizontally zig-zag and hill-and-dale records, said member being adapted to complete the communication between the sound box and the tone arm in one position, and to break such communication in another position, a unitary member for completing such communications when so broken, and means for holding said movable members in the positions desired.

22. Coupling means for connecting a sound box to the tone arm of a gramophone, comprising a casing attached to one of said parts, a member pivoted to the casing to complete a direct communication between the sound box and the tone arm in one position, and to break such communication in another position, a unitary member for restoring the communication when so broken, and means for keeping said movable members in the positions desired.

23. Coupling means for connecting a sound box to the tone arm of a gramophone, comprising a casing attached to one of said parts, a member connected to the other of said parts, and pivoted to the casing to complete a direct communication between the sound box and the tone arm in one position, and to break such communication in another position, and pivoted to the casing so that the radius between said pivot and the longitudinal axis of the stylus of the sound box is substantially the same as the distance between said pivot and the center of the sound passage of the tone arm to automatically maintain the same distance between the stylus point and vertical axis of the tone arm in the alternate positions of the sound box for hill-and-dale and horizontally zig-zag records, a unitary member for restoring the communication when so broken, and means for keeping said movable members in the positions desired.

24. Coupling means for connecting a sound box to the tone arm of a gramophone, comprising a casing attached to one of said parts serving as a stop, a member pivoted to the casing to complete a direct communication between the sound box and the tone arm in one position, and to break such communication in another position, a pivotally mounted unitary member for restoring the communication when so broken, and means for keeping said movable members in the positions desired.

25. Coupling means for connecting a sound box to the tone arm of a gramophone, comprising a member pivoted to one of said parts, and attached to the other of said parts, whereby direct communication between the sound box and the tone arm is made in one position, and broken in another position, a pivotally mounted unitary member for restoring such communication when so broken, and means for keeping said pivoted members in the positions desired.

26. In a gramophone, in combination with the sound box, of a tone arm, a support on the tone arm, a member pivoted on said support and connected to the sound box and adapted in one position to complete a communication between the sound box and the tone arm, and in another position to break such communication, a pivotally mounted unitary member for restoring such communication when so broken and which may be turned outward clear away from between said member and the tone arm when not required for use, and means for keeping said pivotally mounted members in the positions desired.

27. In a gramophone, the combination with the tone arm having a casing secured thereto, of a sound box, a member attached to said sound box and pivoted to the casing so that the radius between said pivot and the longitudinal axis of the stylus of the sound box is substantially the same as the distance between said pivot and the center of the sound passage of the tone arm to automatically obtain the same distance between the stylus point and the vertical axis or support of the tone arm in the alternate positions of the sound box for horizontally zig-zag and hill-and-dale records, said member being adapted to complete the communication between the sound box and the tone arm in one position, and to break such communication in another position, pivotally mounted means for completing such communication when so broken, and which may be moved clear from the sound box when not required for use, and means for keeping said pivotally mounted member in the positions desired.

28. Coupling means for connecting a sound box to the tone arm of a gramophone, comprising a casing attached to one of said parts, a member connected to the other of said parts and pivoted to the casing to complete a direct communication between the sound box and the tone arm in one position, and to break such communication in another position, a unitary member for restoring the communication when so broken, and which may be moved clear from the sound box when not required for use, and means for keeping said movable members in the positions desired.

29. Coupling means for connecting a sound box to the tone arm of a gramophone, comprising a casing detachably connected to one of said parts serving as a stop, a member connected to the other of said parts and pivoted to the casing to complete a direct communication between the sound box and the tone arm in one position, and to break such communication in another position, a pivotally mounted unitary member for restoring the communication when so broken, and which may be moved clear from the sound box when not required for use, and means for keeping said movable members in the positions desired.

30. Coupling means for connecting a sound box to the tone arm of a gramophone, comprising a member pivoted to one of said parts, and attached to the other of said parts, whereby direct communication between the sound box and tone arm is made in one position, and broken in another position, a pivotally mounted unitary member for restoring such communication when so broken, and which may be moved clear from the sound box when not required for use, and means for keeping said pivoted member in the positions desired.

31. Coupling means for connecting a sound box to the tone arm of a gramophone, comprising a casing attached to one of said parts, a member connected to the other of said parts, and pivoted to the casing to complete a direct communication between the sound box and the tone arm in one position, and to break such communication in another position, and pivoted to the casing so that the radius between said pivot and the longitudinal axis of the stylus of the sound box is substantially the same as the distance between said pivot and the center of the sound passage of the tone arm to automatically maintain the same distance between the stylus point and vertical axis of the tone arm in the alternate positions of the sound box for hill-and-dale and horizontally zig-zag records, a unitary member for restoring the communication when so broken, and which may be moved clear from the sound box when not required for use, and means for keeping said movable members in the positions desired.

In testimony whereof I affix my signature in presence of two subscribing witnesses.

JOSE HOFFAY.

Witnesses:
- ALFRED DAY,
- WALTER DAY.